UNITED STATES PATENT OFFICE.

ALEXANDER S. RAMAGE, OF NEWARK, NEW JERSEY, ASSIGNOR TO THE ELECTRO STEEL COMPANY OF CANADA, LTD., OF WELLAND, ONTARIO, CANADA, A CORPORATION.

METHOD OF RECOVERING IRON FROM ORES AND PREPARING IRON ALLOYS.

949,004.   Specification of Letters Patent.   Patented Feb. 15, 1910.

No Drawing.   Application filed August 21, 1909. Serial No. 514,020.

*To all whom it may concern:*

Be it known that I, ALEXANDER S. RAMAGE, a citizen of the United States, residing at Newark, in the county of Essex and State of New Jersey, have invented certain new and useful Improvements in Methods of Recovering Iron from Ores and Preparing Iron Alloys, of which the following is a specification.

The object of the present invention is the provision of a method whereby electrolytic iron of high purity, or certain desired alloys, may be cheaply and easily obtained from ores or compounds of iron, and particularly such as by reason of their physical character, inherent impurities, etc., are almost or quite unworkable by ordinary metallurgical processes.

The method will be described by way of example as applied to the treatment of magnetite containing titanium, a material whereof vast deposits have long been known. This material may be directly reduced under conditions as hereafter described, but when, as is often the case, the iron content is susceptible of magnetic concentration, I prefer to subject it to such concentration before reduction. The impure oxid is then charged into rotary cylinders or other suitable furnaces, and is heated therein in presence of a gaseous reducing agent at a temperature below the melting point of iron until the iron content is reduced to a metallic sponge. The preferred reducing agent is a mixture of hydrogen and carbon monoxid, preferably containing an excess of hydrogen above that contained in ordinary water-gas, and conveniently prepared by adding to water-gas the hydrogen which is expelled during annealing from the electrodeposited iron, as hereafter described. The reduction of the iron occurs at a dull red heat, whereas the titanium oxid is unaffected by this treatment, and remains as an anode sludge in the subsequent electrolysis. The reduction is effected substantially entirely by the hydrogen of the reducing agent; the carbon monoxid and any residual hydrogen being used for heating the furnaces.

Instead of a gaseous reducing agent I may employ carbon, but in this case the metallic powder is unsuited for use as anodes in the electrolytic production of the purest grades of iron, and is preferably purified by magnetic separation before being subjected to electrolysis.

The iron powder or sponge containing unreduced oxid of titanium but substantially free from carbon is discharged from the furnace into air-tight vessels wherein it is permitted to cool and is then electrolytically dissolved in a suitable electrolyte, and the iron deposited in a state of substantial purity, except for the occluded hydrogen which it retains in large proportions. The preferred conditions of electrolysis are the employment of an electrolyte containing ferrous sulfate and ammonium sulfate, together with some organic material such as glycerin, glue, etc. The cathodes may be sheets of iron or revolving tubes. The current density during the electrolysis should preferably be about ten amperes per square foot and the temperatures 140° F. Owing to the extremely pervious condition of the metal, the acid liberated by electrolysis dissolves the anodes very quickly and the baths do not become acid for a long time.

I have observed that by using spongy iron as the anode, the iron dissolves at substantially the same speed as that at which it is deposited, so that the electrical energy required amounts to but little more than enough to supply the resistance losses, thus enabling a much lower voltage current to be used than if there is used, as anode, cast iron or scrap, the rate of solution of which is comparatively slow. An electromotive force approximating one-half volt is suitable. Should acidity occur the liquor may be neutralized in any known way. It is further desirable that the electrolyte be kept out of contact with air as much as possible by means of a layer of oil, or the like, so that the formation of ferric salts may be avoided. As ferric salts are nevertheless likely to be formed to a greater or less extent, I prefer to acidify the liquor occasionally, add some of the metallic powder and heat to boiling, whereby the liberated hydrogen reduces the ferric salts to ferrous salts, thus regenerating the bath.

The electrolytically deposited iron is saturated with hydrogen, and the cathodes after removal from the bath, may be heated or annealed in closed boxes which are fitted with pipes leading to pumps which exhaust the hydrogen and deliver it to be mixed with water-gas for reducing the ore to the metallic state.

Instead of magnetite, the method is applicable to other ores of iron, as for example the burnt ore from copper extraction works, technically known as "blue billy," a material containing upward of 90 per cent. of ferric oxid, with a little lead, copper, sulfur, calcium, etc. In case pyrites is used, it is first roasted to drive off the sulfur, and then reduced.

The electrodeposited iron is saturated with hydrogen, which may be expelled by annealing under reduced pressure as above described. In certain cases however, and particularly when the iron is to serve for the preparation of special or alloy steels, I prefer to oxidize the hydrogen in presence of the iron, using for this purpose the reducible oxids of the elements to be alloyed with the iron. For example, the iron cathodes may be melted down in magnesia crucibles in an electric or other furnace with a suitable proportion of the iron sponge containing titanium oxid derived from the reducing furnaces. During this operation the titanium oxid is reduced by the hydrogen which was occluded by the iron, and the titanium alloys with the iron. Or the cathodes may be melted with other reducible oxids, such as those of vanadium, chromium, tungsten, etc., whereby the corresponding metals are reduced and alloyed with the iron. It is of course understood that further additions of metals or carbon may be made for the preparation of any desired alloy or special or tool steel, and that the melting may be facilitated by the use of appropriate fluxes.

Many magnetites contain traces of platinum and iridium as metals and these may by the use of appropriate electrolytes, as chlorid solutions, be dissolved and deposited with the iron, improving its qualities for some purposes: or if remaining in the anode sludge, they may be recovered therefrom by appropriate treatment.

I claim:

1. The method of recovering iron from ores, which consists in reducing the ore and preparing an iron sponge substantially free from carbon, and electrolytically refining said sponge.

2. The method of recovering iron from ores, which consists in reducing the ore by means of a gaseous reducing agent and preparing an iron sponge substantially free from carbon, and electrolytically refining said sponge.

3. The method of recovering iron from ores, which consists in reducing the ore by means of a mixture of hydrogen and water gas and preparing an iron sponge substantially free from carbon, and electrolytically refining said sponge.

4. The method of recovering iron from ores, which consists in reducing the ore to a spongy metallic condition, electrolytically depositing iron from a suitable solution using the spongy iron as anode, and separating the occluded hydrogen from the electrodeposited metal.

5. The method of recovering iron from ores, which consists in reducing the ore to a spongy metallic condition, electrolytically depositing iron from a suitable solution using the spongy iron as anode, and separating the occluded hydrogen from the electrodeposited metal by oxidation.

6. The method of recovering iron from ores and preparing alloys, which consists in reducing the ore to a spongy metallic condition, electrolytically depositing iron from a suitable solution using the spongy iron as anode, and oxidizing the occluded hydrogen by means of an oxid of an alloying metal.

7. The method of removing occluded hydrogen from electrodeposited iron, which consists in disseminating through the electrodeposited iron in a molten state, a reagent capable of oxidizing hydrogen.

8. The method of removing occluded hydrogen from electrodeposited iron, which consists in disseminating through the electrodeposited iron in a molten state, a metallic oxid reducible by hydrogen.

9. The method of preparing alloys from electrodeposited iron containing occluded hydrogen, which consists in melting the iron in presence of a reducible oxid of an alloying metal.

10. The method of recovering iron from titaniferous iron ores, which consists in reducing the iron without substantial reduction of titanium, thereby preparing an iron sponge containing titanium oxid, and electrolytically refining said sponge.

11. The method of recovering iron from titaniferous iron ores, which consists in reducing the iron without substantial reduction of titanium, thereby preparing an iron sponge containing titanium oxid, electrolytically refining said sponge, and finally melting the electrodeposited iron, containing occluded hydrogen, in presence of the reduced sponge containing titanium oxid.

In testimony whereof, I affix my signature in presence of two witnesses.

ALEXANDER S. RAMAGE.

Witnesses:
GEORGE G. GOODRICH,
WM. MAHER.